United States Patent [19]

Knipp et al.

[11] 4,185,065
[45] Jan. 22, 1980

[54] PROCESS FOR MANUFACTURING TIRE SEGMENTS

[75] Inventors: Ulrich Knipp, Berg.-Gladbach; Paul Vente, Leverkusen, both of Fed. Rep. of Germany

[73] Assignee: Bayer Aktiengesellschaft, Leverkusen, Fed. Rep. of Germany

[21] Appl. No.: 858,573

[22] Filed: Dec. 8, 1977

[30] Foreign Application Priority Data

Dec. 23, 1976 [DE] Fed. Rep. of Germany ....... 2658374

[51] Int. Cl.² ........................... B29D 3/02; B29H 5/02
[52] U.S. Cl. .................................... 264/254; 264/511; 264/269; 264/308; 264/312; 264/326; 425/115; 425/576
[58] Field of Search ............... 264/254, 267, 269, 308, 264/310, 312, 315, 326, 511; 425/64, 115, 574–577

[56] References Cited

U.S. PATENT DOCUMENTS

| | | | |
|---|---|---|---|
| 2,710,425 | 6/1955 | Rhodes | 264/326 X |
| 3,836,612 | 9/1974 | Mann | 264/310 X |

Primary Examiner—Jan H. Silbaugh
Attorney, Agent, or Firm—Gene Harsh; Joseph C. Gil; R. Brent Olson

[57] ABSTRACT

This invention relates to a process for the manufacture of a tire in segments in a closed mold wherein the internal surface of the mold determines the shape of the external surface of the tire segments, comprising:

(a) radially moving from the center of a mold towards the internal surface of the mold a molding tool which determines the shape of the internal surface of the tire segments while leaving a space between said molding tool and said internal surface of said mold, said space conforming to the shape of said tire segments;

(b) filling said space between said molding tool and said internal surface with a plastic compound; and when said plastic compound is solidified, (c) moving said mold or said molding tool in the circumferential direction so that the next segment follows immediately upon the segment already produced.

6 Claims, 2 Drawing Figures

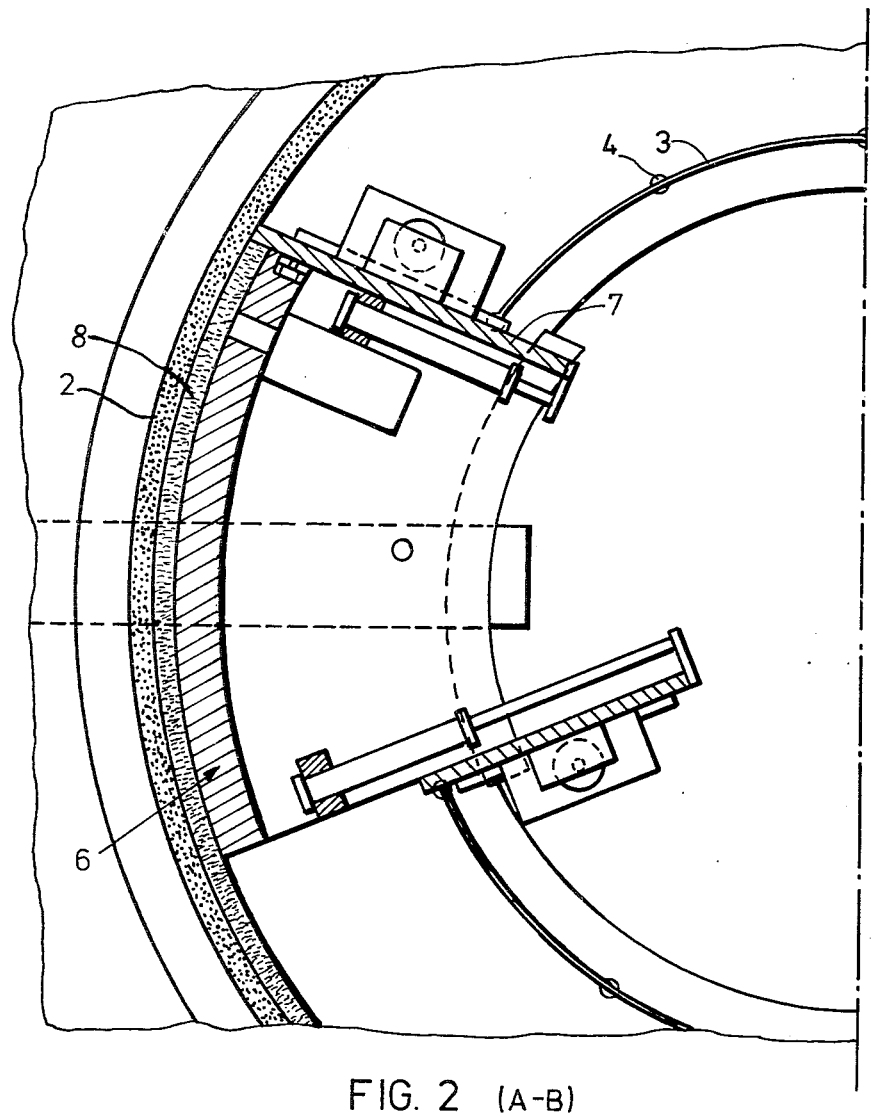
FIG. 2 (A-B)

PROCESS FOR MANUFACTURING TIRE SEGMENTS

BACKGROUND OF THE INVENTION

The manufacture of tires is expensive in machinery and labor. Known processes for the manufacture of cast tires include the lost core process, the centrifugal ladel method and the Zelant-Gazuit bladder process. It is an object of the present invention to provide tire-like structures which can be produced by an economical process and yet satisfy stringent requirements in their use properties. Manufacture of these tire-like structures should be capable of being carried out without core-molding of the inner tube, and sprue losses should be avoided.

BRIEF DESCRIPTION OF THE DRAWINGS

FIG. 2 is a top plan view onto the plane of the tool.

DESCRIPTION OF THE INVENTION

Figure 1:
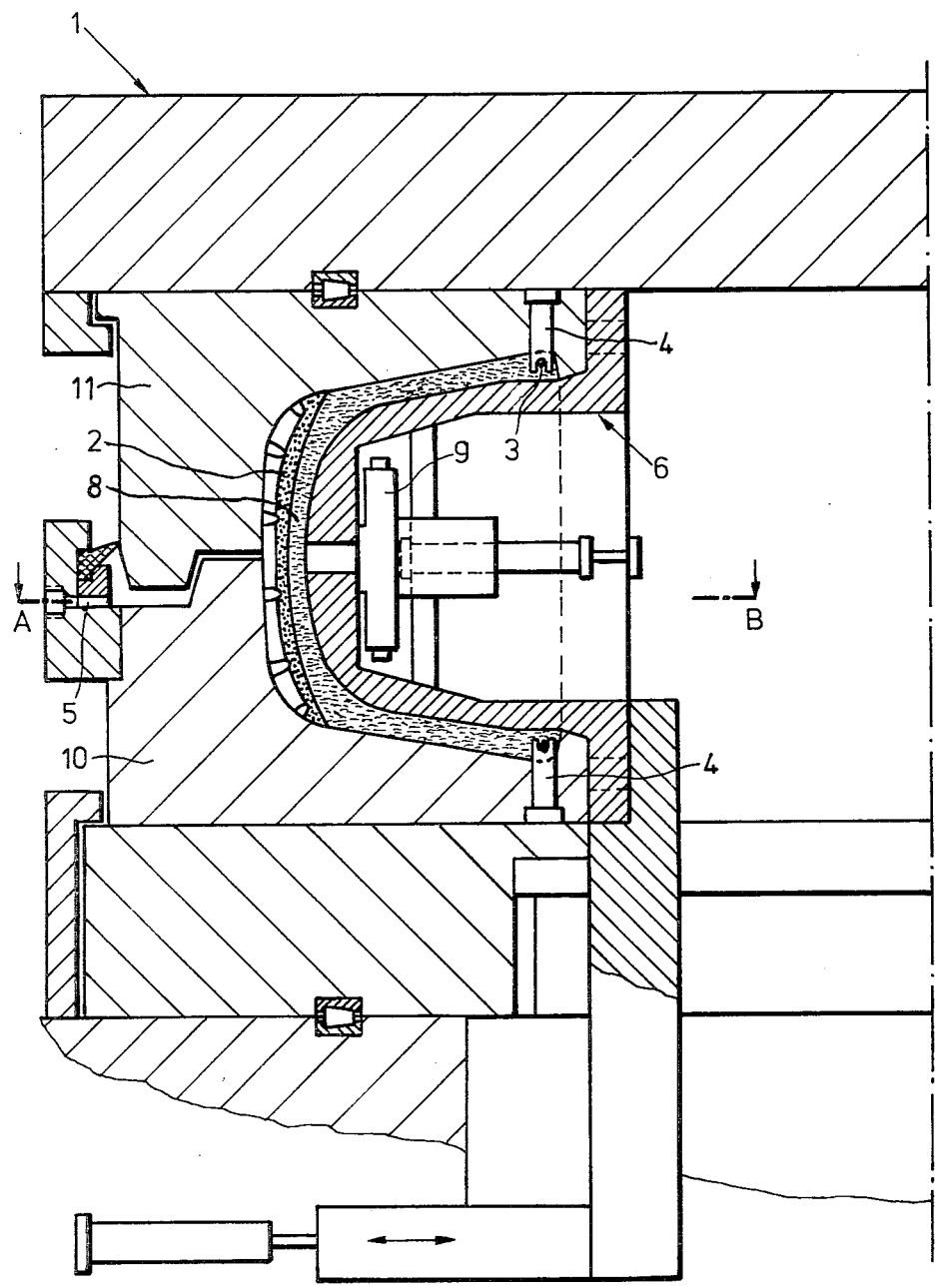
FIG. 1 shows a section through the mold of an embodiment of the apparatus according to the invention.

This invention is directed to the manufacture of tires or their parts or segments using plastic compounds, preferably polyurethane. The tires are continuously produced in a closed mold. A molding tool is used that allows a space between the internal surface of the mold and the surface of the tool. A plastic compound is deposited in the space. The internal surface of the mold will determine the external surface of the tire, or tire part. The molding tool moves radially from the center of the mold. Bulkheads are inserted perpendicular to the plane of the tire. The tire or tire part is formed in sections or segments. The internal surface of the mold, surface of the molding tool, and bulkhead surfaces form the shape of the tire segments.

In continuous operation, the space formed by the internal surface of the mold, surface of the molding tool, and surface of the bulkheads is filled with a plastic compound. When the compound has solidified, the molding tool is rotated in the circumferential direction. One of the surfaces of the solidified compound acts as a bulkhead for the next space to be filled. Thus, no bulkhead is introduced in between the segment already produced and the newly formed space. As can be seen, the tire, or tire part, is formed in segments along the circumference.

This process can be used for producing carcases and tread surfaces of tires. Pneumatic tires can also be produced by a single operation in this way. In the case of pneumatic tires, it is frequently desired to use different qualities of elastomers for the tread surface and for the lateral parts of the tire. Pneumatic tires of this kind can also be produced by a further development of the process according to the invention, in which the tread surface previously produced by the process according to this invention, or by some other known process, is placed on the internal surface of the mold and the whole tire is built up segment by segment from a plastic compound which is particularly suitable for the lateral parts of the tire. Reinforcing elements can also be built into the tire-like structure in the same manner, f.e. textile fabrics, fleeces and wires of steel cord. The use of fibre-filled elastomers is possible.

Polyurethane resins are particularly suitable plastic compounds for the tire-like structures. They may advantageously be introduced as reaction mixtures through one or more mixing heads or as thermoplastic injection molding compounds through an extruder head. In many cases, it is possible to carry out the construction of the tire continuously. The plastic compound is fed in continuously while the molding tool moves slowly and continuously over the internal surface of the tire-like structure. The bulkhead normally placed perpendicularly to the plane of the tire is in this case omitted. The molding tool is normally fixed while the mold slowly rotates.

It is a major advantage that the finished core can be removed from the mold without difficulty and without any mechanical or manual effort. Whereas in other manufacturing processes only elastomers which solidify to a wax-like rigidity can be used, which do not satisfy the strictest requirements. It is possible in this process to use high-quality polyurethane elastomers which solidify to a rubbery consistency. These give rise to high quality tires. Tire-like structures can be produced very economically and with great uniformity by this process.

The tools necessary for carrying out the process are illustrated in the drawings by way of example and described in more detail below.

A prefabricated tread surface (2) is introduced into the lower half of the opened mold (1). The part which gives rise to the outer contour of the tire consists of a lower part (10) and an upper part (11). The inner contour of the tire is formed by the tool (6). Foot ring inserts (3) are placed on the magnet cores (4) (permanent magnets) of the mold. In that way they are fixed in the mold. When the mold has been closed, air is removed by suction through a channel (5), the tread surface being thereby firmly held against the wall of the mold. A molding tool (6) is moved radially inwards. Lateral bulkheads (7) and axial bulkheads (not shown) form the boundaries to one segment (8) of the tire. The magnet cores (4) also help to seal off the lateral bulkhead. The space (8) is filled with a polyurethane mixture from a mixing head (9). When the reaction has been completed, the axial bulkheads and lateral bulkheads are withdrawn and the molding tool is moved towards the center. The mold is then again turned through a certain distance.

This process is repeated for production of the second segment. That bulkhead which is facing away from the direction of rotation is left in the open position, i.e. it remains withdrawn. When the last section of the carcase is being filled, the front bulkhead is also withdrawn.

In one variation of the process, two molding tools are employed. In addition, the segments must be axially displaceable in alternation with each other. In such a mold, the tread surface and the carcase are produced in a single molding tool, and the lateral bulkheads for the manufacture of the tread surface conform to the profile of the tool to ensure adequate sealing.

What is claimed is:

1. A process for the manufacture of a tire in segments in a closed mold wherein the internal surface of the mold determines the external surface of the tire segments, comprising:

(a) radially moving from the center of a mold towards the internal surface of the mold a molding tool which determines the shape of the internal surface of the tire segments while leaving a space between said molding tool and said internal surface of said mold, said space conforming to the shape of said tire segments;

(b) filling said space between said molding tool and said internal surface with a plastic compound, and when said plastic compound is solidified;

(c) moving said mold or said molding tool in the circumferential direction so that the next segment follows immediately upon the segment already produced; and (d) repeating steps (a), (b), and (c) until the tire is formed.

2. The process of claim 1, within said mold with said space between said molding tool and said internal surface is limited perpendicularly to the plane of the tire by placing and displacing bulkheads in the radial direction, so as to limit the segments produced in the circumferential direction.

3. The process of claim 1, characterized in that a tread surface is placed on said internal surface of the mold.

4. The process of claim 1, characterized in that reinforcing elements are placed on said internal surface of the mold.

5. The process of claim 1, characterized in that said plastic compound is a polyurethane reaction mixture which is introduced through a mixing head.

6. The process of claim 5, characterized in that said plastic compound is a thermoplastic polyurethane elastomer which is introduced through an extrusion head.

* * * * *